US011435240B2

(12) United States Patent
Phan Le et al.

(10) Patent No.: US 11,435,240 B2
(45) Date of Patent: Sep. 6, 2022

(54) APPARATUS FOR DETERMINATION OF TEMPERATURE

(71) Applicant: NXP B.V., Eindhoven (NL)

(72) Inventors: Kim Phan Le, Eindhoven (NL); Jozef Thomas Martinus van Beek, Rosmalen (NL); Mamuka Katukia, Waalre (NL)

(73) Assignee: NXP B.V., Eindhoven (NL)

( * ) Notice: Subject to any disclaimer, the term of this patent is extended or adjusted under 35 U.S.C. 154(b) by 419 days.

(21) Appl. No.: 16/518,129

(22) Filed: Jul. 22, 2019

(65) Prior Publication Data

US 2020/0072680 A1 Mar. 5, 2020

(30) Foreign Application Priority Data

Aug. 30, 2018 (EP) .................................... 18191848

(51) Int. Cl.
*G01K 11/24* (2006.01)
*G01F 1/66* (2022.01)

(52) U.S. Cl.
CPC .............. *G01K 11/24* (2013.01); *G01F 1/662* (2013.01)

(58) Field of Classification Search
None
See application file for complete search history.

(56) References Cited

U.S. PATENT DOCUMENTS

| 5,624,188 A | 4/1997 | West |
| 2002/0101905 A1 | 8/2002 | Luthi |
| 2006/0253007 A1* | 11/2006 | Cheng .................... A61B 8/065 600/310 |
| 2014/0198822 A1 | 7/2014 | Sui et al. |
| 2016/0320349 A1* | 11/2016 | Murphy ................ G01N 29/024 |
| 2017/0003176 A1* | 1/2017 | Phan Le .............. G01N 29/032 |

FOREIGN PATENT DOCUMENTS

| DE | 102013009516 A1 | 12/2014 |
| WO | WO-2013/179202 A2 | 5/2013 |

* cited by examiner

*Primary Examiner* — Erica S Lin

(57) ABSTRACT

An apparatus comprising an acoustic transducer arrangement configured to transmit at least one acoustic signal and configured to detect a reflection of said at least one acoustic signal, and a controller configured to determine a time-of-flight of the at least one acoustic signal, the controller further configured to determine at least a first value indicative of temperature based on said time-of-flight of the at least one acoustic signal and calibration information indicative of a relationship between time-of-flight and temperature in a space the apparatus is located.

17 Claims, 4 Drawing Sheets

APPARATUS FOR DETERMINATION OF TEMPERATURE

CROSS-REFERENCE TO RELATED APPLICATIONS

This application claims the priority under 35 U.S.C. § 119 of European patent application no. 18191848.3, filed Aug. 30, 2018 the contents of which are incorporated by reference herein.

The present disclosure relates to an apparatus configured to determine a value indicative of temperature and, in particular, an apparatus configured to determine said value based on a measurement of a time-of-flight of an acoustic signal. It also relates to an associated method and a heating and/or cooling system.

The effective determination of temperature in a space, such as room or warehouse for example, may be difficult particularly when temperature distribution in the space is not homogeneous.

According to a first aspect of the present disclosure there is provided an apparatus comprising an acoustic transducer arrangement configured to transmit at least one acoustic signal and configured to detect a reflection of said at least one acoustic signal, and a controller configured to determine a time-of-flight of the at least one acoustic signal, the controller further configured to determine at least a first value indicative of temperature based on said time-of-flight of the at least one acoustic signal and calibration information indicative of a relationship between time-of-flight and temperature in a space the apparatus is located.

In one or more examples, the acoustic transducer arrangement comprises a first acoustic transducer configured to transmit the at least one acoustic signal and a second acoustic transducer configured to detect the reflection of said at least one acoustic signal, wherein the first acoustic transducer and second acoustic transducer are co-located in a common housing.

In one or more embodiments, the acoustic transducer arrangement is configured to one or both of
  transmit said at least one acoustic signal in different directions and
  receive said at least one acoustic signal from different directions such that the path followed by the at least one acoustic signal extends through a first part of said space and a second, different part of said space; and
  wherein the controller is configured to determine at least two values indicative of temperature comprising the first value based on the at least one acoustic signal that followed the path through the first part and thereby indicative of the temperature of the first part and a second value based on the at least one acoustic signal that followed the path through the second part and thereby indicative of the temperature of the second part.

Thus, in one or more examples, the apparatus thereby obtains values indicative of the average temperature from different parts of the space or room in which the apparatus is located.

In one or more embodiments the transducer arrangement comprises
  a first acoustic transducer configured to transmit a first acoustic signal in a first direction and a second acoustic transducer configured to detect the reflection of said first acoustic signal; and
  a third acoustic transducer configured to transmit a second acoustic signal in a second direction different to the first direction and a fourth acoustic transducer configured to detect the reflection of said second acoustic signal.

In one or more examples, the first acoustic transducer and the second acoustic transducer are the same transducer, and/or the third acoustic transducer and the fourth acoustic transducer are the same transducer.

In one or more examples, one or more of the first acoustic transducer, the second acoustic transducer, the third acoustic transducer and the fourth acoustic transducer are audible audio speakers. In one or more examples, one or more of the first acoustic transducer and the third acoustic transducer are audio speakers suitable for generating audible audio as well as ultrasound. In one or more examples, one or more of the second acoustic transducer and the fourth acoustic transducer are audible audio microphones suitable for receipt of audible audio as well as ultrasound.

In one or more embodiments, the transducer arrangement comprises a phased array acoustic transducer transmitter configured to transmit a first acoustic signal substantially in a first direction and to transmit a second acoustic signal substantially in a second, different, direction, the transducer arrangement further comprising at least one acoustic transducer configured to receive the reflections of the first acoustic signal and the second acoustic signal.

Thus, in one or more examples, the phased array acoustic transducer transmitter is configured to transmit said first acoustic signal and said second acoustic signal using a beamforming technique.

In one or more embodiments, the transducer arrangement comprises at least one acoustic transducer configured to transmit the at least one acoustic signal, the transducer arrangement further comprising a phased array acoustic transducer receiver configured to receive a first acoustic signal, comprising at least a reflected part of the at least one acoustic signal, substantially from a first direction and receive a second acoustic signal, comprising at least a reflected part of the at least one acoustic signal, substantially from a second, different, direction.

In one or more examples, the transducer arrangement comprises said phased array acoustic transducer transmitter and said phased array acoustic transducer receiver for transmitting and receiving acoustic signals that follow paths through different parts of the space.

In one or more embodiments, the calibration information is, at least in part, indicative of a distance from the acoustic transducer arrangement to an object from which the at least one acoustic signal is reflected and a distance from said object to the acoustic transducer arrangement.

In one or more embodiments, the apparatus includes a distance determination sensor configured to determine the distance to the object and wherein the apparatus is configured to determine the calibration information based on said determined distance.

In one or more embodiments, the distance determination sensor comprises a laser-based distance measurement device or a radar-based distance measurement device. In other examples, the distance may be measured manually and the apparatus may comprise input means configured to receive the measurement for determination of the calibration information.

In one or more embodiments, the calibration information is, at least in part, indicative of a reference time-of-flight measurement of an acoustic signal transmitted by the acoustic transducer arrangement and a reflection thereof received by the acoustic transducer arrangement, termed a calibration acoustic signal, and a reference temperature taken within a predetermined time of the reference time-of-flight measurement and at a location within a predetermined distance of a path followed by the calibration acoustic signal.

In one or more embodiments, the apparatus is configured to receive the reference temperature from a temperature probe configured for communication of the reference temperature to the apparatus.

In one or more embodiments, the apparatus is configured to provide for presentation of one or more prompts to a user for obtaining reference temperatures from one or more parts of the space.

In one or more embodiments, the apparatus includes a temperature sensor different from the acoustic transducer arrangement and the controller is configured to operate in a calibration mode and a measurement mode, wherein, in the calibration mode, the controller is configured to:

determine a temperature from the temperature sensor;

determine a first estimated distance the at least one acoustic signal, transmitted in or received from the first direction, travels based on a time-of-flight measurement and said temperature determined by the temperature sensor; and determine a second estimated distance the at least one acoustic signal, transmitted in or received from the second direction, travels based on a time-of-flight measurement and said, same, temperature determined by the temperature sensor; and wherein the first estimated distance and the second estimated distance form at least part of the calibration information and wherein in the measurement mode the at least two values indicative of temperature are determined using the time-of-flight of the at least one acoustic signal and the calibration information determined in the calibration mode.

In one or more embodiments, the controller is configured to operate in the calibration mode based on receipt of information indicative of when one or both of a cooling device in the space and a heating device in the space are inactive.

In one or more embodiments, the apparatus includes a humidity sensor configured to provide a measure of humidity in the space, wherein the calibration information is further based on said measure of humidity.

In one or more examples, the value indicative of temperature is based, additionally, on the measure of humidity.

In one or more embodiments, the controller is configured to determine the value indicative of temperature at repeated intervals and wherein the controller is configured to ignore at least one or more of the values based on a determination that an object has intersected a path followed by the at least one acoustic signal and thereby affected the time-of-flight determined by the controller. In one or more examples, the determination that an object has intersected the path is performed by a machine learning algorithm that has been provided with appropriate training data. In one or more examples, the determination that an object has intersected the path is performed based on a change in the time-of-flight beyond a predetermined threshold.

According to a second aspect of the present disclosure there is provided a method for an apparatus comprising an acoustic transducer arrangement and a controller comprising:

transmitting, by the acoustic transducer arrangement, at least one acoustic signal;

detecting, by the acoustic transducer arrangement, a reflection of said at least one acoustic signal;

determining, by the controller, a time-of-flight of the at least one acoustic signal;

determining, by the controller, at least a first value indicative of temperature based on said time-of-flight of the at least one acoustic signal and calibration information indicative of a relationship between time-of-flight and temperature in a space the apparatus is located.

According to a third aspect of the present disclosure there is provided a heating and/or cooling system for a space including at least one heating device and/or cooling device respectively and the apparatus of the first aspect, the apparatus configured to provide for control of the at least one heating device and/or cooling device.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF DRAWINGS

One or more embodiments will now be described by way of example only with reference to the accompanying drawings in which.

In one or more examples, the temperature of a space, such as a room, may be determined by a thermostat, which may form part of a space-heating or space-cooling system, such as a central heating system or air-conditioning system. Thermostats typically use physical temperature sensors to measure the temperature of a space. The space may comprise any of a room in house, an office, a warehouse or any other residential or commercial building. The temperature sensors used are often electrical resistance-based temperature detector (RTD) type, thermo-couple type or diode type. The temperature sensors are often mounted inside a housing of the thermostat. In some examples, a disadvantage of such temperature sensors is that they are expected to provide a temperature representative of the temperature in the whole of the space but can sometimes show erroneous temperature readings. The reason for such erroneous temperature readings may be sunshine falling on the thermostat, localized heat sources such as light bulbs that provide a significant local heating effect but little overall effect on the temperature in the whole space and the position at which they are mounted such as on an external or internal wall, etc. In those cases, the temperature sensors may show errors of up to several degrees. As will be appreciated, thermostats are typically used to control heating or cooling systems and thus erroneous readings can result in inappropriate temperature-based control of those systems and waste of energy. In fact, it can be considered that the temperature sensor measures temperature of the thermostat (i.e. the temperature in a housing thereof), rather than a temperature of the ambient air in the space or room the thermostat is located.

In one or more examples, rooms may have multiple radiators or air-conditioners, which maybe controlled simultaneously by the thermostat and this can be inefficient because some parts of the room can temporarily have a different temperature than that at the thermostat location (for instance parts of the space near windows or doors often have a lower temperature during the winter time).

In one or more examples, a user may want to have different temperature settings for different zones of the same room, e.g. a warmer couch corner and a cooler open-kitchen. A traditional way to achieve this is to use multiple sensors at different places, which adds complexity to the system.

Figure 1:
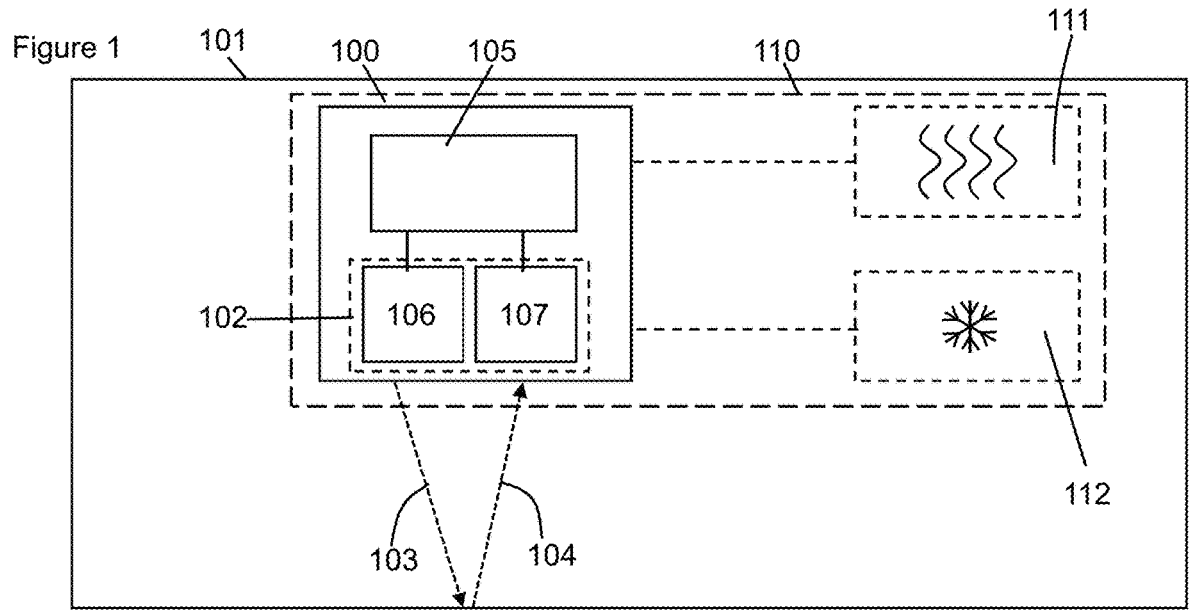
FIG. 1 shows an example embodiment of an example embodiment of an apparatus.

Example FIG. 1 shows an embodiment of an apparatus 100 for determining temperature of a space 101. In one or more examples, such an apparatus 100 may be considered to be or incorporated within a thermostat, such as a thermostat of a heating and/or cooling system. The apparatus 100 comprises an acoustic transducer arrangement 102 configured to transmit at least one acoustic signal 103 and configured to detect a reflection 104 of said at least one acoustic signal. The apparatus 100 may further comprise a controller 105 configured to determine a time-of-flight of the at least one acoustic signal 103, 104 comprising, for example, the time it takes from transmission to travel through the space 101, reflect from an object in the space such as a wall or floor and for the reflected acoustic signal 104 to travel through the space 101 back to the acoustic transducer arrangement 102. In this embodiment the controller 105 is further configured to determine at least a first value indicative of temperature based on said time-of-flight of the at least one acoustic signal 103, 104 and calibration information indicative of a relationship between time-of-flight and temperature in the space 101 the apparatus 100 is located.

Thus, the calibration information may be particular to the space 101 in which the apparatus 100 is installed. Accordingly, the apparatus 100 may be configured to operate in a calibration mode in which the calibration information is measured and/or determined and a measurement mode in which it uses the calibration information to determine temperature from subsequent time-of-flight measurements. The acoustic signal may comprise an ultrasound signal or any other non-audible acoustic signal. The acoustic signal may comprise a single tone, it may be of multiple frequencies, it may comprise a chirp, it may comprise a pulse or it may comprise a wideband signal or any appropriate combination. The acoustic signal may be modulated, such as with a predetermined sequence. The predetermined pattern may provide for specific autocorrelation/cross-correlation properties that may assist in determining the time-of-flight time. Further the determination of the time of flight is based on the transmission of the acoustic signal and the time of receipt of its reflection and thus, by implication, the acoustic signal has traveled through the space, reflected from an object (i.e. not the apparatus itself or its housing), and traveled back through the space which provide an indication of average temperature over the path followed by the acoustic signal. Thus, the acoustic transducer arrangement may be configurable to control the path of the acoustic signal and its reflection to obtain a temperature measurement over a desired part of the space 101.

The controller 105 may, in one or more examples, includes a timer to measure the time difference between when the acoustic signal was transmitted and when its reflection was received. In one or more examples, the controller may include a correlator configured to receive the transmitted acoustic signal and the received reflection of the transmitted acoustic signal and determine a correlation from which the time-of-flight is determined.

In this and one or more examples, the acoustic transducer arrangement comprises a first acoustic transducer 106 configured to transmit the at least one acoustic signal and a second acoustic transducer 107 configured to detect the reflection of said at least one acoustic signal, wherein the first acoustic transducer 106 and second acoustic transducer 107 are co-located in a common housing. In one or more examples, the first and second acoustic transducer are the same transducer and thus the single acoustic transducer acts as both the transmitter and receiver of the acoustic signal.

The speed of sound in an ideal gas can be expressed by equation (1).

$$c_{air} = \sqrt{\gamma k T / m} \text{ (m/s)} \quad (1)$$

in which γ is the adiabatic index, k is the Boltzmann constant, T is the absolute temperature in Kelvin, and m is the is the mass of a single gas molecule in kilograms. For dry air, the formula may be simplified to the form of equation 2.

$$c_{dry\text{-}air} = 20.05\sqrt{T} \text{ (m/s)} \quad (2)$$

Figure 2:
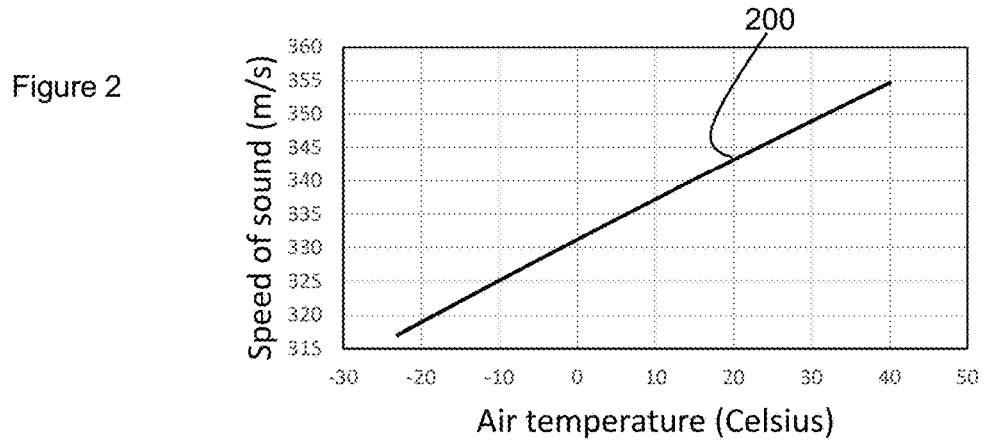
FIG. 2 shows an example graph illustrating a relationship between the speed of sound in air and air temperature.
Figure 3:
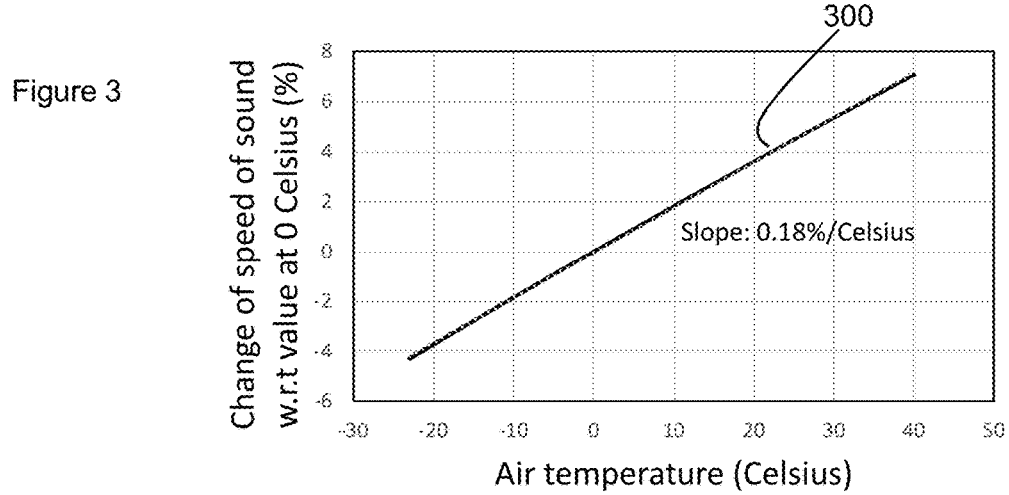
FIG. 3 shows an example graph illustrating the relative change in the speed of sound in air with respect to a value taken at 0° C. vs air temperature.

Example FIG. 2 shows the relation 200 as formulated in equation 2 for a typical temperature range for consumer applications of a temperature sensor used as a thermostat (−20° C. to +40° C.). With reference to FIG. 2, within this range, the relationship 200 is very close to a linear function. In example FIG. 3, the relative change 300 in the speed of sound (expressed as a percentage) with respect to value at zero degrees Celsius vs. air temperature is shown. The slope of change is about 0.18% per degree.

Hence, for dry air, a measurement of speed of sound can reveal air temperature. Speed of sound ($c_{air}$) can be calculated from the distance that an acoustic signal or sound wave travels (d) and the time it takes to do so (t): $c_{air} = d/t$. In a measurement, if d is known, $c_{air}$ can be derived if the time delay between sending and receiving a sound wave can be measured i.e. the time-of flight.

Thus, in one or more examples, determination of the time-of-flight of an acoustic signal over a predetermined distance (to determine $c_{air}$ or $c_{dry\text{-}air}$) can be related to temperature. Even if the distance over which the acoustic signal travels is not known, it may be possible to assume it is a constant and use equation (2) to determine the temperature. The use of the time-of-flight of an acoustic signal may be advantageous as an average temperature over the path taken by the acoustic signal may be inherently determined.

Figure 4:
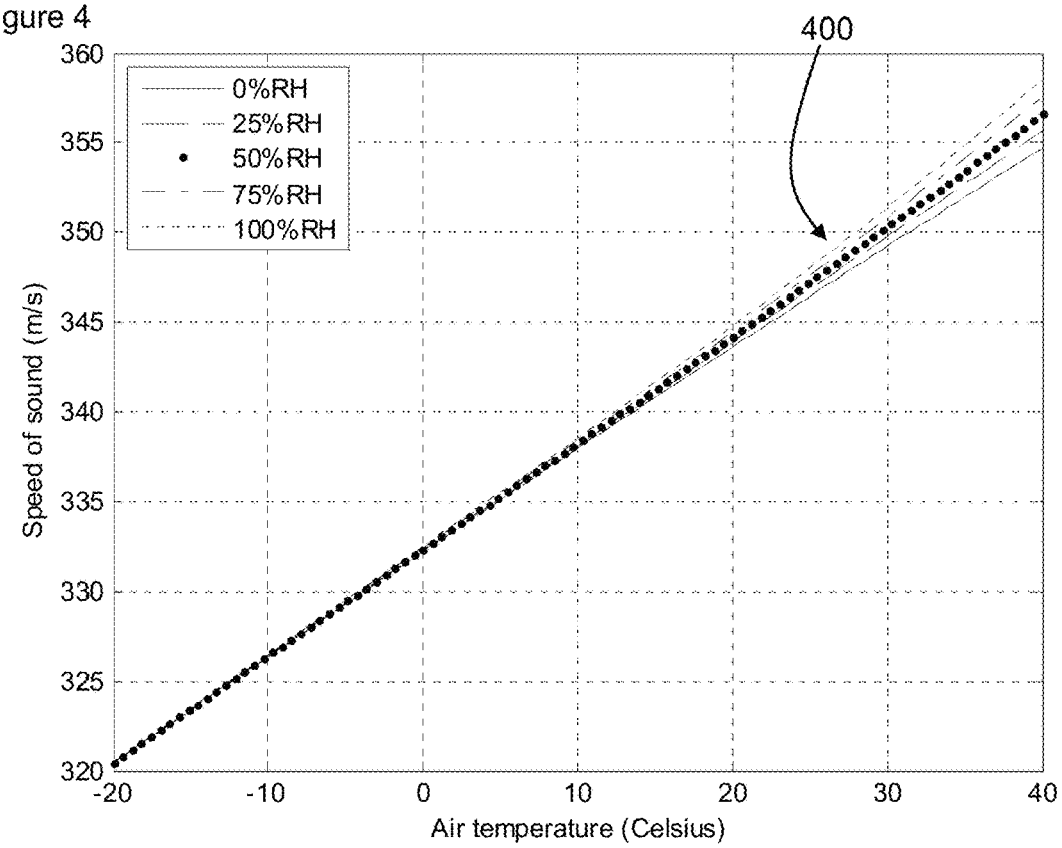
FIG. 4 shows an example graph illustrating the speed of sound in air vs. air temperature at different relative humidity values.

For humid air, the relation is slightly different and may require some correction. Example FIG. 4 shows the relationships 400 between the calculated speed of sound vs. air temperature for five different air humidity levels—0% relative humidity, 25% relative humidity, 50% relative humidity, 75% relative humidity and 100% relative humidity.

In air, the speed of sound is a function of relative humidity (RH). However, this dependence is insignificant at low temperature and may be considered, in one or more examples, non-ignorable at higher temperatures (e.g. above 0° C. or above 10° C. or any other selected temperature). At a constant temperature, as relative humidity increases, the speed of sound increases. For the purpose of a temperature measurement, if RH is not known, the obtained temperature will have some uncertainty or error.

Figure 5:
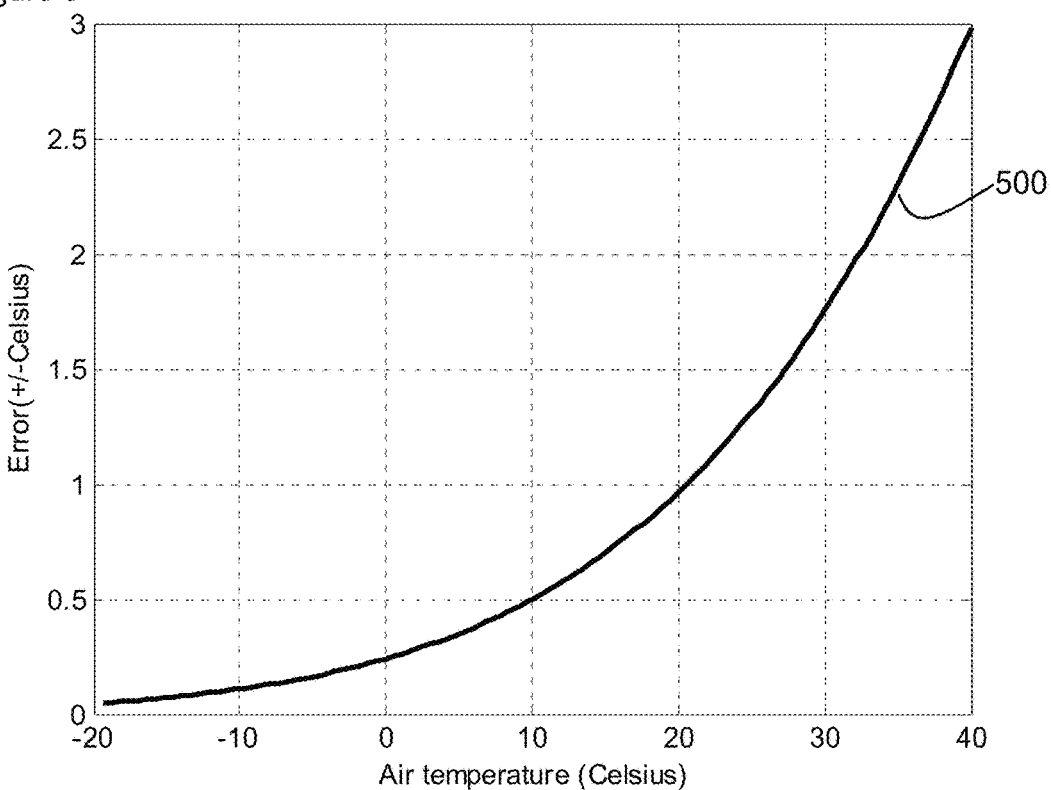
FIG. 5 shows an example graph of measurement error due to an uncertainty of relative humidity as a function of ambient air temperature

FIG. 5 shows temperature error 500 (in ±° C.) when RH=50% is blindly assumed for all measurements. It can be seen that depending on the target accuracy desired, such as ±1° C., then when air temperature is about or under 20° C., the error caused by non-consideration humidity can be ignored. However, the error becomes more significant and, in one or more examples, non-ignorable at above 20° C. for example, and becomes ±3° C. at 40° C. Thus, in one or more examples, above 20° C., a correction for relative humidity may be performed.

Since the dependence of speed of sound on humidity is relatively small, in one or more examples, it may be acceptable to obtain only a rough estimate of relative humidity in order to bring down the error at the aforementioned "higher temperatures". For example, assuming a room temperature of 40° C., if relative humidity can be determined with a granularity of three levels, e.g. low level 0%≤RH≤40%, middle level 40%<RH≤70% and high level 70%<RH≤100%, the apparatus 100 may be configured to determine a value indicative of temperature with an accuracy of equal or better than ±1° C. (in terms of the error occurring due to humidity).

In one or more examples, the apparatus 100 may provide for determination of a value indicative of temperature without consideration of relative humidity. In one or more examples, the apparatus 100 may provide for determination of a value indicative of temperature with consideration of a measure of the relative humidity. In one or more examples, the apparatus 100 may provide for determination of a value indicative of temperature with consideration of an approximation of relative humidity, such as based on a categorization of relative humidity into up to two, three, four, five or more ranges.

Thus, in one or more examples, the apparatus 100 may contain a relative humidity sensor and the controller 105 may be configured to determine at least the first value indicative of temperature based on said time-of-flight of the at least one acoustic signal 103, 104, the relative humidity information from the humidity sensor and calibration information indicative of a relationship between time-of-flight and temperature at the humidity indicated by the humidity information in the space 101 that the apparatus 100 is located. In one or more examples, the relative humidity information from the relative humidity sensor may form part of the calibration information. In one or more examples, the information from the relative humidity sensor may be assumed to apply to all parts of the space, i.e. humidity is uniform over the space 101. In other examples, the calibration information may include information indicative of the humidity levels in different parts of the space 101 and the controller 105 may determine the value indicative of temperature based in part thereon.

Figure 6:
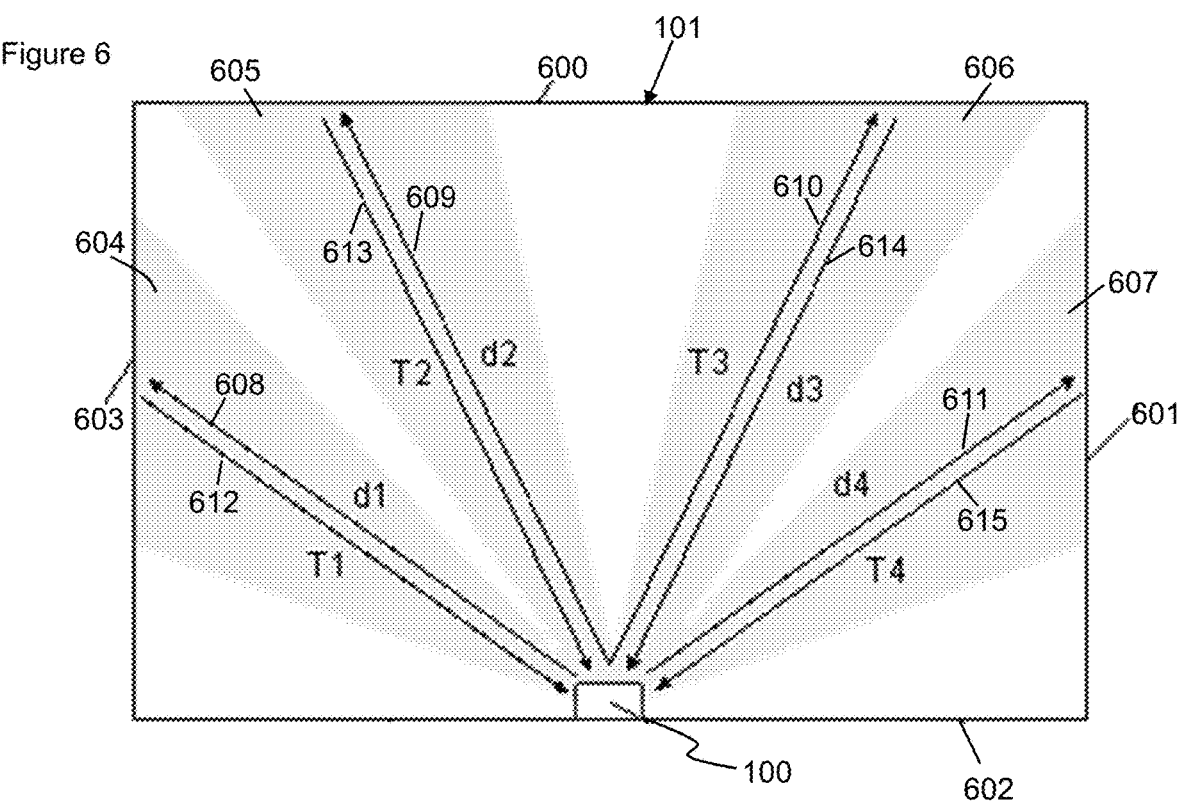
FIG. 6 shows a first example arrangement of the apparatus in a space.

We now consider a first example embodiment of the apparatus 100 with reference to example FIG. 6. FIG. 6 shows a plan view of a space 101 comprising a room in a building having walls 600-603. The apparatus 100, in this example, is mounted to the wall 602.

The apparatus 100 may be configured to determine at least two values indicative of temperature from different parts of the space 101. The values indicative of temperature are average temperatures over the path followed by the acoustic signal and its reflection. Thus, by directing or receiving the acoustic signal(s) to/from different parts of the space, at least two temperature values can be determined. The apparatus 100 in this example embodiment is configured to determine four values of temperature from four different parts 604, 605, 606, 607 of the space 101. The acoustic transducer arrangement 102 may therefore be configured to transmit four acoustic signals 608, 609, 610, 611, sequentially or simultaneously, in the direction of the different parts 604, 605, 606, 607 of the space 101. In one or more examples, as will be described in more detail below, the acoustic transducer arrangement 102 may be configured to receive reflected acoustic signals 612, 613, 614, 615, sequentially or simultaneously, that arrive at the transducer arrangement 102 at different angles of arrival and are therefore reflected signals returning to transducer arrangement 102 from the direction of the different parts 604, 605, 606, 607 of the space 101.

Thus, in one or more examples, in general terms, the acoustic transducer arrangement 102 of the apparatus 101 is configured to at least one of:
 transmit said at least one acoustic signal 608, 609, 610, 611 in different directions (the directions of parts 604, 605, 606, 607); and
 receive a reflection of said at least one acoustic signal from different directions
 such that the path followed by the at least one acoustic signal extends through a first part (any one of parts 604, 605, 606, 607) of said space and a second, different part (any other of parts 604, 605, 606, 607) of said space.

The apparatus 100 may be configured to transmit four separate acoustic signals (i.e. a number of acoustic signal corresponding to the number of parts of the space 101 for which a temperature value is required). In one or more examples, the acoustic signals 608, 609, 610, 611 may be generated or modulated to be individually identifiable, which may be used by the apparatus 100 to identify a received acoustic signal as a reflection of the transmitted signal, particularly when the transmitted signals are transmitted simultaneously or close together in time. In one or more examples, one acoustic signal may be transmitted (or, more generally, fewer acoustic signals than the number of parts of the space 101 for which a temperature value is required), such as in directions that extend over the different parts 604, 605, 606, 607, and the transducer arrangement is configured to receive the reflections from particular directions corresponding to the parts 604, 605, 606, 607.

Further, the controller 105 is configured to determine at least two values (four in this example embodiment) indicative of temperature. Thus, the controller may determine the first value based on the at least one acoustic signal that followed a path through the first part (604 for example) and thereby indicative of the temperature of the first part. FIG. 6 shows the acoustic signal 608 and its reflection 612 from wall 603 such that it follows a path through the first part 604. The controller may determine a second value based on the at least one acoustic signal that followed a path through the second part 605 and thereby indicative of the temperature of the second part. FIG. 6 shows the acoustic signal 609 and its reflection 613 from wall 600 such that it follows a path through the part 605. The controller may determine a third value based on the at least one acoustic signal that followed a path through the third part 606 and thereby indicative of the temperature of the third part. FIG. 6 shows the acoustic signal 610 and its reflection 614 from wall 600 such that it follows a path through the part 606. The controller may determine a fourth value based on the at least one acoustic signal that followed the path through the fourth part 607 and thereby indicative of the temperature of the fourth part. FIG. 6 shows the acoustic signal 611 and its reflection 615 from wall 601 such that it follows a path through the fourth part 607.

In one or more examples, a plurality of reflected acoustic signals may be generated as a transmitted acoustic signal reflects from objects in the space 101. In one or more examples, the controller 105 may be configured to determine the time-of-flight based on a first received reflection (e.g. in terms of the time after transmitting). In other examples, the strongest (e.g. in terms of amplitude) received reflection may be used.

In the example of FIG. 6, the first acoustic signal 608 is shown to have a shortest round trip time from reflecting from wall 603 of T1 seconds; the second acoustic signal 609 is shown to have a shortest round trip time from reflecting from wall 600 of T2 seconds; the third acoustic signal 610 is shown to have a shortest round trip time from reflecting from wall 600 of T3 seconds; and the fourth acoustic signal 611 is shown to have a shortest round trip time from reflecting from wall 601 of T4 seconds. Based on information about the round trip distances from the apparatus 100 to each of the respective walls and back (shown as $d_1$, $d_2$, $d_3$, $d_4$) and assuming those distances are fixed, then speed of sound in the four parts 604-607 can be calculated by $c_x = d_x/T_x$, where x is from 1 to 4 for the four acoustic signal and corresponding reflections. The distances $d_x$ may comprise the calibration information, as will be described in more detail below. In one or more examples, a temperature calibration may be performed, the results of which may comprise the calibration information, which is also described in more detail below. From the calculated speeds of sound $c_x$, temperatures along the four directions representative of parts 604-607 can be calculated from Eq. (1) or (2). Thus, the apparatus may be configured to determine an average speed of sound based on the determined time-of-flight and the calibration information and, subsequently, determine the value indicative of temperature based on the determined average speed of sound. In other examples, the apparatus may be configured to use a predetermined relation that relates time-of-flight to the value indicative of temperature.

These values indicative of temperature may be average ambient air temperatures along the path of the acoustic signal. In one or more examples, an advantage of measuring temperature using ultrasound is that the direct air temperature is measured, and thus there is no influence from the temperature of solid objects such as walls, the apparatus or "thermostat" housing, radiation such as sunshine, or local heat sources. Another possible advantage is that temperature can be measured instantaneously without any or inconsequential delay, as compared to the physical sensors, which may require a finite period of time to react and "sense" changes in air temperature.

Thus, in one or more examples, the apparatus 100 thereby obtains values indicative of temperature from different parts 604, 605, 606, 607 of the space 101 or room in which the apparatus is located. The values indicative of temperature may by actual temperature values, such as in degrees Celsius, Kelvin or any other known temperature scale. In other examples, the values output by the apparatus 100 may be relatable to temperature by a known function based on a known relationship or may comprise relative changes in temperature relative to a reference point.

As mentioned above, the determination of temperature from the different parts 604, 605, 606, 607 may be obtained from acoustic signals that have traveled different paths through the space 101 and, in particular, paths through the different parts 604, 605, 606, 607. The transducer arrangement 102 may take different forms in different embodiments to achieve this.

In one or more examples embodiments, the transducer arrangement 102 comprises an acoustic transducer pair for each part 604, 605, 606, 607. Accordingly, the acoustic transducer arrangement 102 may comprise:

a first acoustic transducer configured to transmit a first acoustic signal in a first direction (to part 604) and a second acoustic transducer configured to detect the reflection of said first acoustic signal;

a third acoustic transducer configured to transmit a second acoustic signal in a second direction (to part 605) different to the first direction and a fourth acoustic transducer configured to detect the reflection of said second acoustic signal.

a fifth acoustic transducer configured to transmit a third acoustic signal in a third direction (to part 606), different to the first and second directions, and a sixth acoustic transducer configured to detect the reflection of said third acoustic signal;

a seventh acoustic transducer configured to transmit a fourth acoustic signal in a fourth direction (to part 607), different to the first, second and third directions, and an eighth acoustic transducer configured to detect the reflection of said fourth acoustic signal.

It will be appreciated that more or less acoustic transducers may be provided depending on the number of parts from which temperature values are required.

Thus, the first, third, fifth and seventh acoustic transducers, which act as transmitters, may face the different directions to provide their transmitted acoustic signal primarily in the different directions. The first, third, fifth and seventh acoustic transducers are preferably mounted in the same housing. Further, the second, fourth, sixth and eighth acoustic transducers, which act as receivers, may also face the different directions or may be configured to be sensitive to reflections from a broader range of directions. The "receiver" acoustic transducers are preferably mounted in the same housing, and preferably co-located with the "transmitter" acoustic transducers. In one or more examples, the first acoustic transducer and the second acoustic transducer are the same transducer, and/or the third acoustic transducer and the fourth acoustic transducer are the same transducer, and/or the fifth acoustic transducer and the sixth acoustic transducer are the same transducer, and/or the seventh acoustic transducer and the eighth acoustic transducer are the same transducer. Thus, a signal transducer may act as a transmitter and receiver for transmitting and receiving an acoustic signal through its associated part 604, 605, 606, 607.

In one or more other examples, the second, fourth, sixth and eighth acoustic transducers, namely the "receiver" transducers, may comprise a common transducer that operates in conjunction with the aforementioned plurality of separate "transmitter" transducers.

In one or more examples, the one or more of the acoustic transducers of the acoustic transducer arrangement 102 are audible audio speakers. It is becoming common for "smart thermostat" products to have voice control functionality and therefore such an apparatus may have audio speakers and microphones for such functionality. In this case, ultrasound transmission and reception for the acoustic signal based temperature measurement may use the audio speakers as transmitters and the microphone as a receiver. The ultrasound signals can be added to any voice prompts or responses before transmission and separated from voice information after reception. Since ultrasound is inaudible, the quality of audible signal (voice) is not affected.

In one or more examples, the acoustic transducer arrangement 102 comprises a phased array acoustic transducer transmitter, which may comprise a plurality of array elements. The phased array, based on a plurality of input signals provided to the array elements, the input signals differing in phase relative to one another, may generate an acoustic signal that propagates substantially in a predetermined direction. The phased array may be configured to transmit a first acoustic signal substantially in a first direction (e.g. in the direction of part 604) and to transmit, subsequently, a second acoustic signal substantially in a second, different, direction (e.g. in the direction of part 605) and to transmit, subsequently, a third acoustic signal substantially in a third, different, direction (e.g. in the direction of part 606) and to transmit, subsequently, a fourth acoustic signal substantially in a fourth, different, direction (e.g. in the direction of part 607). It will be appreciated that the first through fourth acoustic signal may be transmitted in any order and different numbers of signals may be generated than as shown in this example. During a transmission, using a phased array acoustic transducer transmitter, for example, the apparatus 100 may be configured to send identical ultrasound signals with different phase shifts to the array elements in such a way that they create a constructive wave front at a certain angle while at other angles they form destructive interference. As will be understood by those skilled in the art, effectively, this is equivalent to having a directional transducer emitting soundwaves at a selected/in a selected direction angle and may be known as a beamforming technique. The angle(s)/directions(s) can be freely set by setting the phase shifts appropriately. During operation, sequences of ultrasound waves may be sent to the transducer array with different phases to provide the acoustic signal that travel through the different parts. The transducer arrangement 102 may comprise at least one acoustic transducer configured to receive the reflections of the first through fourth acoustic signals.

In one or more examples, rather than transmit the acoustic signal(s) in specific directions, the temperature of the different parts 604-607 may be determined by receiving reflections that arrive at the acoustic transducer arrangement from the direction of those parts. Thus, the transducer arrangement 102 may be configured to discriminate the direction from which the reflected acoustic signal is received.

Thus, in one or more examples, the transducer arrangement 102 may comprise at least one acoustic transducer configured to transmit the at least one acoustic signal. The acoustic transducer configured to act as a transmitter may be configured to transmit a single or a plurality of acoustic signals over a wide range of directions or a plurality of acoustic signals over more discrete directions. Further, the transducer arrangement 102 may further comprising a phased array acoustic transducer receiver, comprising a plurality of array elements, configured to receive the reflected acoustic signals form at least two different parts of the space 101. By delaying signals of the array elements appropriately, the phased array acoustic transducer receiver can output a constructive signal at a certain direction, as if it could directionally listen to only acoustic waves at that angle. In this way, the direction of reflected acoustic signals can also be freely defined and temperature at different parts can be obtained in the similar way as the "transmitter phased array" embodiment above.

In particular, in this example, the phased array acoustic transducer receiver may be configured to receive a first acoustic signal, comprising at least a reflected part of the at least one acoustic signal, substantially from a first direction (e.g. in the direction of part 604) and receive a second acoustic signal, comprising at least a reflected part of the at least one acoustic signal, substantially from a second, different, direction (e.g. in the direction of part 605) and receive a third acoustic signal, comprising at least a reflected part of the at least one acoustic signal, substantially from a third, different, direction (e.g. in the direction of part 606) and receive a fourth acoustic signal, comprising at least a reflected part of the at least one acoustic signal, substantially from a fourth, different, direction (e.g. in the direction of part 607).

In one or more examples, the transducer arrangement 102 comprises said phased array acoustic transducer transmitter and said phased array acoustic transducer receiver for transmitting and receiving acoustic signals that follow paths through different parts of the space. By using a phased array as a transmitter and as a receiver, the apparatus may be more discerning of the path followed by the acoustic signal such that its time-of-flight may be more representative of the temperature in the desired part 604-607 of the space 101. Turning now to the calibration information, which may be considered to provide a function or information to translate the time-of-flight measurements into temperature values. As described above in relation to FIG. 6, the calibration information may comprise the distances over which the plurality of acoustic signals/reflected acoustic signals travel, namely $d_1$, $d_2$, $d_3$, $d_4$. The controller 105 may thus determine the speed of sound $c_x$ in each of the four parts 604-607 using $c_x = d_x/T_x$. Then, using the speed of sound, a temperature for each part may be determined using equations 1 or 2.

Thus, in one or more examples, the calibration information is, at least in part, indicative of the distance from the acoustic sensor arrangement to an object 600, 601, 607 from which the acoustic signal is reflected and a distance from said object to the acoustic sensor arrangement, i.e. $d_1$, $d_2$, $d_3$, $d_4$ or $2.d_1$, $2.d_2$, $2.d_3$, $2.d_4$.

The determination of the distances $d_1$, $d_2$, $d_3$, $d_4$ may require the acquisition of distance information either by receiving manually entered data or by an automated process in a calibration mode.

In one or more examples, the apparatus 100 may include a distance determination sensor (not shown) configured to determine the distances $d_1$, $d_2$, $d_3$, $d_4$ to the object 600, 601, 603 and wherein the apparatus 100 is configured to determine the calibration information based on said determined distances. The distance determination sensor may comprise a laser-based distance measurement device or a radar-based distance measurement device. The distance determination sensor may be mounted in a common housing with the acoustic transducer arrangement 102.

The distance determination sensor is configured to provide a measure of distance that uses a transmitted ranging signal that has a transmission speed independent of temperature. Accordingly, the ranging signal is an electromagnetic signal. The beam directions of the distance determination sensor may be pre-set at different angles which correspond to the directions in which the acoustic signals are transmitted/received to provide an accurate measurement of the length of the path followed by the acoustic signal. A laser-based distance measurement device may be configured to measure the distances by calculating the round-trip time of laser pulses. A radar-based distance measurement device may be configured to measure the distances $d_1$, $d_2$, $d_3$, $d_4$ by calculating the round-trip time of radio (RF) pulses or other type of signalling. The radio wave used for the radar may be of millimetre wave wavelength and, in one or more examples, has a wide bandwidth (such as Ultra-Wide Band). It will be appreciated that directional antennas or phased array antennas are available for radar-based distance measurement devices that can transmit the radio frequency waves in directions corresponding to the acoustic signal beams in a similar manner. By measuring the round-trip time of the transmitted RF signal, the distances can be calculated. The bandwidth of the RF signal may be carefully selected such that the ranging accuracy is at least equivalent to the required temperature resolution, as will be understood by those skilled in the art.

The apparatus 100 may be configured to make the distance measurements for establishing the calibration information at least once in a calibration mode, for example at the time of installation. In one or more examples, the apparatus 100 may be configured to update the calibration information by use of the distance determination sensor to remeasure the distances $d_1$, $d_2$, $d_3$, $d_4$. The apparatus 100 may be configured to remeasure the distances at least once a week or once a day or some other frequency. For example, the apparatus may be configured to update the calibration information once during night, since at that time there is less chance of people walking in the room. The updating of calibration information by measurement of the distances $d_1$, $d_2$, $d_3$, $d_4$ may account for any changes in the furniture which may alter the paths the acoustic signals take through the space 101.

In other examples, the distance(s) may be measured manually and the apparatus may include input means configured to receive the measurement for determination of the calibration information. Thus, the measurements may be received via a user interface or an app.

In one or more examples, the distances may be difficult to measure or the apparatus may be configured to use calibration information other than the determined distances. Instead, the calibration information may comprise one or more "reference" time-of-flight measurements made by the controller 105 during a calibration mode and one or more corresponding reference temperatures taken during the calibration mode. Then, changes in the time-of-flight relative to the reference time-of-flight can be related to a change in temperature relative to the reference temperature. The apparatus 100 may be configured, in one or more examples, to use calibration information that is, at least in part, indicative of a reference time-of-flight measurement of an acoustic signal transmitted by the acoustic transducer arrangement and a reflection thereof received by the acoustic transducer arrangement, termed a calibration acoustic signal, and a reference temperature taken within a predetermined time of the reference time-of-flight measurement and at a location within a predetermined distance of a path followed by the calibration acoustic signal. Thus, the calibration mode may comprise the sending of the calibration acoustic signal to determine a time-of-flight. The reference temperature measurement may then be taken with a different temperature measurement device at a point in the space 101 close to or on the path followed by the calibration acoustic signal. The predetermined time may be short enough that it can be assumed that there is a negligible change in temperature in the space 101 between the time the reference time-of-flight measurement is made and the reference temperature is taken. The predetermined distance may be short enough to ensure that temperature taken is close enough to the part 604-607 through which the acoustic signal travels such that the time-of-flight is representative of the temperature.

The apparatus 100 may thus comprise part of a kit that also includes a portable or handheld temperature sensor that may communicate with the apparatus 100 (or its readings may be entered manually). Thus, during a calibration process, the apparatus 100 may be configured to prompt a user to hold the temperature sensor unit at the different parts 604-607 just before (or after) that the acoustic signal(s) are sent to those different parts 604-607 for determination of the time-of-flight of the acoustic signals. The calibration information may therefore comprise the reference time-of-flight times for each of different parts 603-607 taken during the calibration process with the corresponding reference temperatures. During a measurement mode, the apparatus may be configured to determine values indicative of temperature using the calibration information. Accordingly, the relative changes in the time-of-flight times can be determined from the reference value stored in the memory, and from the known relationship between temperature and speed of sound (Eq. 1 or 2), and assuming non-variant distances $d_1$, $d_2$, $d_3$, $d_4$, values indicative of temperature can be calculated.

In one or more embodiments, the calibration information may be determined automatically by a process followed in a calibration mode without input of a distance from a distance determination sensor or temperature from a portable temperature sensor. In one or more examples, the calibration mode may take a few days to complete, but may be more convenient for a user of the apparatus 100 as no measurements of distance or user-taken measurements of temperature are required.

A room (like living room), such as space 101, is known to have inhomogeneous temperature profiles especially when radiators or air-conditioning units are in operation, which may operate based on convection. However, when such heat generating or cooling devices are not operative for some time (e.g. for at least one, two or three hours), the temperature of the different parts 604-607 of the space 101 may be assumed to become more homogeneous. In this case, the actual temperature at the middle of the room height (approximately at positions where thermostats are often mounted) is very close to the average temperature of the room. The apparatus 100 may be configured to operate the calibration mode based on detection of such conditions or at time such conditions may be assumed to be realised (e.g. at night).

The apparatus 100 may include a reference temperature sensor, such as an electro-resistive temperature sensor or any other sensor that does not require calibration information to be obtained before it can be used. The apparatus 100 may be configured to, during a calibration period, such as the first few days of operation after installation, operate, at least in part, in a calibration mode in which the apparatus uses the temperature reading from the reference temperature sensor and assumes that all the parts 604-607 have the same temperature as indicated by this reference sensor. During this period, the reference temperature sensor readings and reference time-of-flight times of the one or more acoustic signals in all parts 604-607 are recorded. The controller 105 may be configured to determine an estimate of the speed of sound $c_x$ from the equation 1 or 2 using the temperature or an average temperature from the measurements made by the reference temperature sensor during the calibration mode. An estimate of the distances $d_1$, $d_2$, $d_3$, $d_4$ may be determined based on the estimate of the speed of sound $c_x$ and the reference time-of-flight times for each of the parts 604-607 using $d_x$=estimate of the speed of sound x reference time-of-flight for each part. The calibration information may then comprise the estimate of the distances $d_1$, $d_2$, $d_3$, $d_4$ and the apparatus 100 may be configured to operate as described above during a measurement mode using the time-of-flight values to determine the one or more values indicative of temperature.

The apparatus 100 may be configured to operate in the calibration mode only when any the radiators/aircons are turned off for at least a few hours (for instance at night, or when occupants leave the house) and considers these temperatures the same temperature of all the zones. Other sensors may be provided, such as a movement sensor or a light sensor or a time-of-day clock for determining when to operate in the calibration mode. Further, in one or more examples, the apparatus 100 may be configured to receive information about when one or both of a cooling device in the space and a heating device in the space are inactive and may be configured to operate in said calibration mode in such a circumstance.

Thus, to summarize in general terms, the apparatus 101 may include a temperature sensor, separate from the acoustic transducer arrangement 102, and the controller 105 is configured to operate in a calibration mode and a measurement mode, wherein, in the calibration mode, the controller is configured to:

determine a first estimated distance $d_1$ the at least one acoustic signal, transmitted in or received from the first direction, travels through part 604 based on a time-of-flight measurement and a temperature determined by the temperature sensor; and determine a second estimated distance the at least one acoustic signal, transmitted in or received from the second direction, travels through part 605 based on a time-of-flight measurement and a temperature determined by the temperature sensor; and determine a third estimated distance the at least one acoustic signal, transmitted in or received from the third direction, travels through part 606 based on a time-of-flight measurement and a temperature determined by the temperature sensor; and determine a fourth estimated distance the at least one acoustic signal, transmitted in or received from the fourth direction, travels through part 607 based on a time-of-flight measurement and a temperature determined by the temperature sensor; and wherein the first, second, third and fourth estimated distances form at least part of the calibration information and, wherein in the measurement mode, the at least four values indicative of temperature are determined using the time-of-flight of the at least one acoustic signal and the calibration information determined in the calibration mode.

It will be appreciated that, in the calibration mode, the temperature determined by the temperature sensor may comprise at least one temperature reading used in the determination of one, some or all of the estimated distances. In one or more examples, the temperature determined by the temperature sensor is a common reading used in the determination of all of the estimated distances $d_1$ to $d_4$ (assuming that the temperature reading is taken within a threshold time of the respective time-of-flight measurements).

It will be appreciated that the number of parts for which the value indicative of temperature is determined may vary in any of the embodiments herein.

In one or more embodiments, the controller 105 is configured to determine the value indicative of temperature at repeated intervals and wherein the controller 105 is configured to ignore at least one or more of the values based on a determination that an object has intersected a path followed by the at least one acoustic signal and thereby affected the time-of-flight determined by the controller. In one or more examples, the determination that an object has intersected the path is performed by a machine learning algorithm that has been provided with appropriate training data. In one or more examples, the determination that an object has intersected the path is performed based on a change in the time-of-flight beyond a predetermined threshold. Thus, in one or more examples, if there is a change in the determined temperature between consecutive measurements greater than a threshold such as 10% or any other threshold, it may be assumed that the time-of-flight is erroneous, perhaps because a person was stood in the acoustic signal's path and thereby shortened the distance traveled by the acoustic signal.

Figure 7:
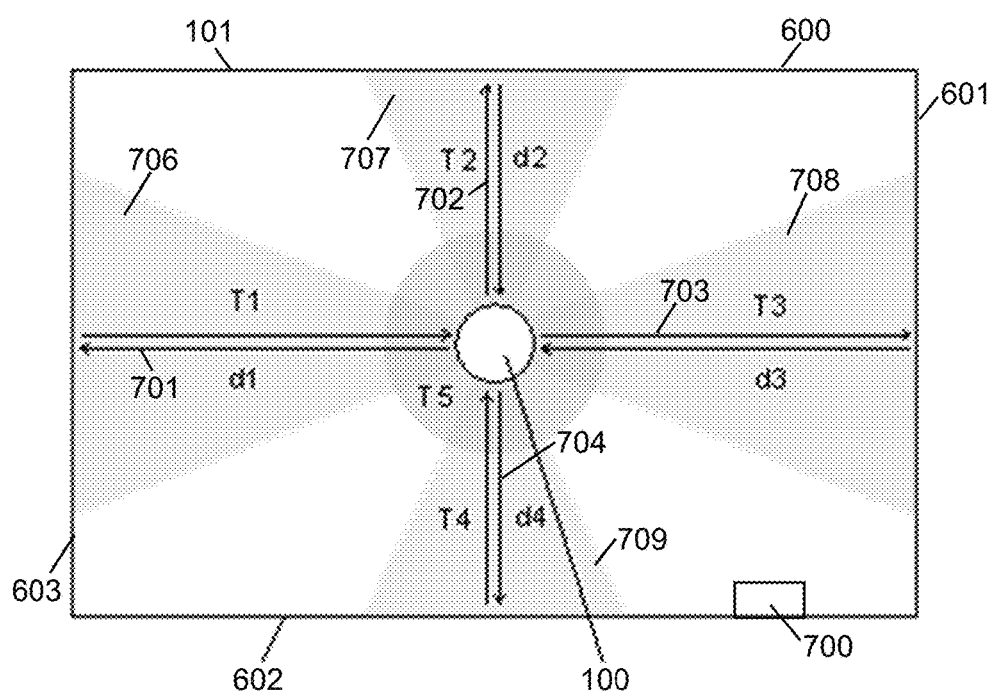
FIG. 7 shows a top view of a second example arrangement of the apparatus in a space.
Figure 8:
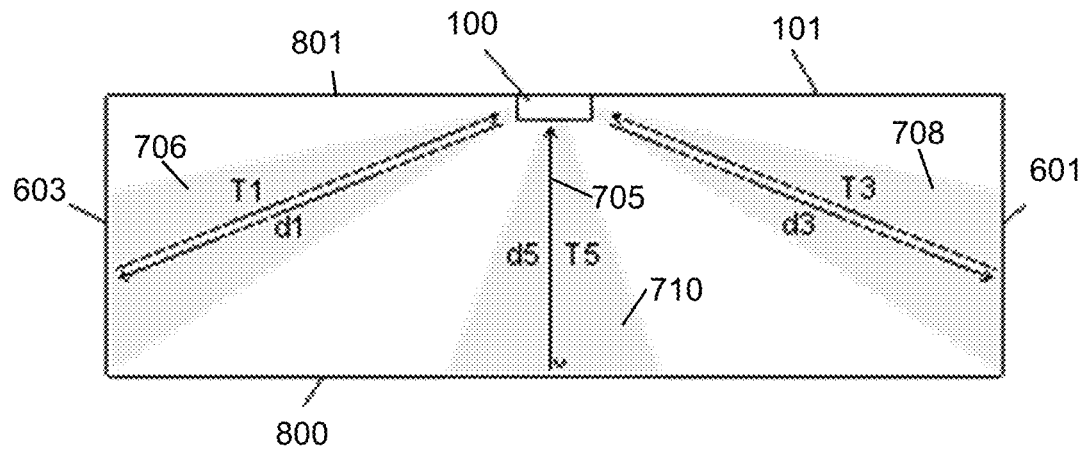
FIG. 8 shows a side view of the second example arrangement of the apparatus in a space.

FIGS. 7 and 8 show a second example embodiment. FIG. 7 shows a plan view of the space 101 and FIG. 8 shows a side view of the space through wall 602. The apparatus 100 similar to as described above is mounted substantially in the middle of the room, on the ceiling 801 (shown in FIG. 8). The apparatus 100 may be connected wirelessly (or wired) to a console unit 700 on one of the walls or to a handheld remote-control device for user control. The apparatus 100 and the console unit 700 may form part of a heating and/or cooling system (described later). As in the previous embodiment, the apparatus 100 contains multiple acoustic transducers (or one or more phased array acoustic transducers).

In this example, the apparatus 100 is configured to transmit five acoustic signals 701-705 through five different parts 706-710 of the space 101. Thus, while the first four acoustic signals are reflected from the walls 600-603, the fifth acoustic signal 705 is transmitted downwards and is reflected from the floor 800 back towards the ceiling 801 to be detected by the apparatus 100. Operation of the apparatus 100 of the second embedment is similar to the first embodiment.

In any of the embodiments it may be appreciated that the path an acoustic signal travels in the space 101 before its reflection reaches the apparatus 100 may extend into parts of the space 101 outside the part 604-607, 706-710 it is intended to measure the temperature of. However, in one or more examples, it may be acceptable that provided that the majority of the path followed by the acoustic signal is within the intended zone, then the time-of-flight measurement will be adequately representative of the average temperature in that part or "zone". In other embodiments, where it may be more important to discriminate between different parts of the room, transmitting the acoustic signal such that it has a beam width less than a first threshold range of degrees from the transmitter and receiving the reflected acoustic signal from a direction within a second threshold range of degrees may provide for more precise understanding of the path taken by the acoustic signal and therefore the part of the space the time-of-flight measurement will represent. The threshold range of degrees may be less than 20° or less than 10° or less than 5°.

As mentioned above, the apparatus 100 may act as a temperature determination device, commonly termed a "thermostat", for a heating and/or cooling system. In particular, the heating and/or cooling system may be configured to control the temperature in different parts of the space 101 to different temperature set-points. The values indicative of temperature from the apparatus 100 of the different parts may be used as feedback for the control of heating device(s) and/or cooling device(s) located within the space 101. Thus, with reference to FIG. 1, there may be provided a heating and/or cooling system 110 including at least one heating device 111 and/or cooling device 112 respectively and the apparatus 100, the apparatus configured to provide for control of the at least one heating device 111 and/or cooling device 112. Thus, the system 110 may be configured to control the operative state of the at least one heating device 111 and/or cooling device 112 or the operative power thereof based on the values indicative of temperature from the apparatus 100 and one or more temperature set-points, which may be user set. The temperature set-points may be for the whole space 101 or the different parts of the space.

Figure 9:
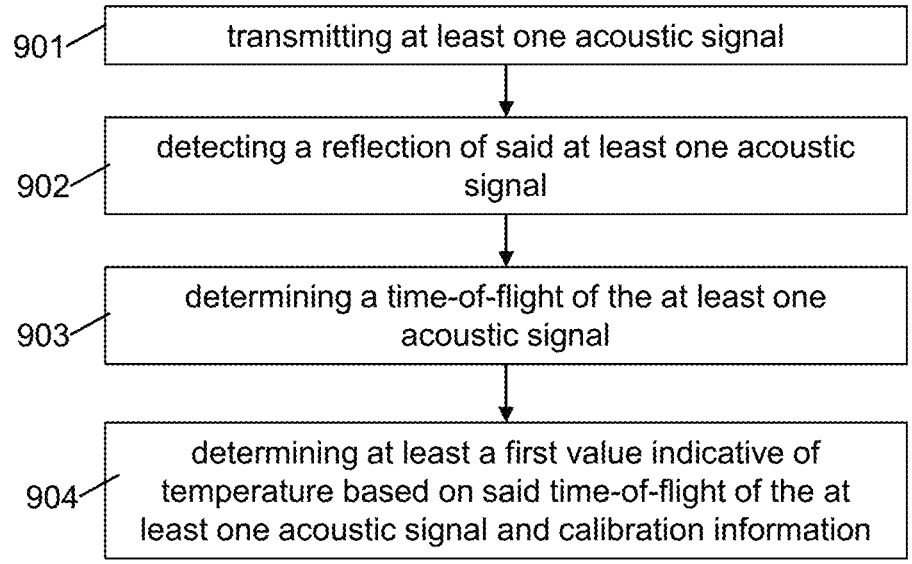
FIG. 9 shows a flowchart illustrating an example embodiment of a method.

FIG. 9 shows a flow chart illustrating an example method. The method comprises a method for an apparatus 100 comprising an acoustic transducer arrangement 102 and a controller 105 comprising:

transmitting 901, by the acoustic transducer arrangement, at least one acoustic signal;
detecting 902, by the acoustic transducer arrangement, a reflection of said at least one acoustic signal;
determining 903, by the controller, a time-of-flight of the at least one acoustic signal;
determining 904, by the controller, at least a first value indicative of temperature based on said time-of-flight of the at least one acoustic signal and calibration information indicative of a relationship between time-of-flight and temperature in a space the apparatus is located.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. An apparatus comprising:
an acoustic transducer configured to both transmit an acoustic signal through a space in which the apparatus is located and also to receive a reflection of the acoustic signal from the space, and
a controller configured to determine a total time-of-flight equal to a time period starting when the acoustic signal was transmitted and ending when the reflection of the acoustic signal was received,
wherein the controller is further configured to determine a temperature of the space based on the total time-of-flight.

2. The apparatus of claim 1,
wherein the acoustic transducer is configured to
transmit the acoustic signal in multiple directions and receive the acoustic signal from multiple directions such that the path followed by the acoustic signal extends through a first part of said space and a second, different part of said space, and
wherein the controller is configured to determine at least two values indicative of temperature comprising,
the first value based on the acoustic signal that followed the path through the first part and thereby indicative of the temperature of the first part, and
a second value based on the acoustic signal that followed the path through the second part and thereby indicative of the temperature of the second part.

3. The apparatus of claim 2,
wherein the transducer comprises
a first acoustic transducer configured to transmit a first acoustic signal in a first direction and a second acoustic transducer configured to receive the reflection of said first acoustic signal; and
a third acoustic transducer configured to transmit a second acoustic signal in a second direction different to the first direction and a fourth acoustic transducer configured to receive the reflection of said second acoustic signal.

4. The apparatus of claim 2,
wherein the acoustic transducer comprises
a phased array acoustic transducer transmitter configured to transmit a first acoustic signal substantially in a first direction and to transmit a second acoustic signal substantially in a second, different, direction, the acoustic transducer configured to receive the reflections of the first acoustic signal and the second acoustic signal.

5. The apparatus of claim 2, the acoustic transducer further comprising a phased array acoustic transducer receiver configured to receive a first acoustic signal, comprising at least a reflected part of the acoustic signal, substantially from a first direction and receive a second acoustic signal, comprising at least a reflected part of the acoustic signal, substantially from a second, different, direction.

6. The apparatus of claim 1, wherein calibration information is, at least in part, indicative of a distance from the acoustic transducer to an object from which the acoustic signal is reflected and a distance from said object to the acoustic transducer.

7. The apparatus of claim 6, wherein the apparatus includes a distance determination sensor configured to determine the distance to the object and wherein the apparatus is configured to determine the calibration information based on said determined distance.

8. The apparatus of claim 1, wherein calibration information is, at least in part, indicative of a reference time-of-flight measurement of an acoustic signal transmitted by the acoustic transducer and a reflection thereof received by the acoustic transducer, termed a calibration acoustic signal, and a reference temperature taken within a predetermined time of the reference time-of-flight measurement and at a location within a predetermined distance of a path followed by the calibration acoustic signal.

9. The apparatus of claim 8, wherein the apparatus is configured to receive the reference temperature from a temperature probe configured for communication of the reference temperature to the apparatus.

10. The apparatus of claim 9, wherein the apparatus is configured to provide for presentation of one or more prompts to a user for obtaining reference temperatures from one or more parts of the space.

11. The apparatus of claim 2 wherein the apparatus includes a temperature sensor different from the acoustic transducer and the controller is configured to operate in a calibration mode and a measurement mode, wherein, in the calibration mode, the controller is configured to:

determine a temperature from the temperature sensor;

determine a first estimated distance that the acoustic signal, transmitted in or received from the first direction, travels based on a time-of-flight measurement and said temperature determined by the temperature sensor; and determine a second estimated distance that the acoustic signal, transmitted in or received from the second direction, travels based on a time-of-flight measurement and said, same, temperature determined by the temperature sensor; and wherein the first estimated distance and the second estimated distance form at least part of calibration information and wherein in the measurement mode the at least two values indicative of temperature are determined using the time-of-flight of the acoustic signal and the calibration information determined in the calibration mode.

12. The apparatus of claim 11, wherein the controller is configured to operate in the calibration mode based on receipt of information indicative of when one or both of a cooling device in the space and a heating device in the space are inactive.

13. The apparatus of claim 1 wherein the apparatus incudes a humidity sensor configured to provide a measure of humidity in the space, wherein calibration information is based on said measure of humidity.

14. A heating and/or cooling system for a space including at least one heating device and/or cooling device respectively and the apparatus of claim 1, the apparatus configured to provide for control of the at least one heating device and/or cooling device.

15. The apparatus of claim 2:

wherein the acoustic transducer is configured to transmit and receive in multiple directions without moving the acoustic transducer.

16. The apparatus of claim 6:

wherein the object is at a fixed distance from the acoustic transducer.

17. The apparatus of claim 6:

wherein the object is a wall.

* * * * *